(12) United States Patent
Bose et al.

(10) Patent No.: US 9,049,523 B2
(45) Date of Patent: Jun. 2, 2015

(54) TRANSDUCER WITH INTEGRATED SENSOR

(75) Inventors: Amar G. Bose, Framingham, MA (US); John H. Wendell, Westford, MA (US)

(73) Assignee: Bose Corporation, Framingham, MA (US)

( * ) Notice: Subject to any disclaimer, the term of this patent is extended or adjusted under 35 U.S.C. 154(b) by 813 days.

(21) Appl. No.: 13/213,356

(22) Filed: Aug. 19, 2011

(65) Prior Publication Data

US 2012/0177215 A1 Jul. 12, 2012

Related U.S. Application Data

(63) Continuation of application No. 12/969,685, filed on Jan. 6, 2011.

(51) Int. Cl.
| | |
|---|---|
| H03F 99/00 | (2009.01) |
| H04R 29/00 | (2006.01) |
| G01D 5/241 | (2006.01) |
| H04R 3/00 | (2006.01) |

(52) U.S. Cl.
CPC ............ *H04R 29/003* (2013.01); *G01D 5/2417* (2013.01); *H04R 3/002* (2013.01)

(58) Field of Classification Search
CPC .... H04R 29/003; H03F 3/165; H03F 3/45278
USPC ............. 381/343, 190–191, 120–121, 58–59; 330/301
See application file for complete search history.

(56) References Cited

U.S. PATENT DOCUMENTS

| | | | |
|---|---|---|---|
| 4,488,012 A * | 12/1984 | Matsuda et al. ................. 381/96 |
| 4,533,794 A * | 8/1985 | Beveridge ..................... 381/174 |
| 5,327,504 A | 7/1994 | Hobelsberger | |
| 6,738,484 B2 * | 5/2004 | Nakabayashi ................. 381/174 |
| 7,501,834 B2 | 3/2009 | Madni et al. | |
| 2002/0172389 A1 * | 11/2002 | Pavlovic ........................ 381/369 |

(Continued)

FOREIGN PATENT DOCUMENTS

| | | |
|---|---|---|
| EP | 1 737 120 A1 | 12/2006 |
| JP | 55092097 A | 7/1980 |

(Continued)

OTHER PUBLICATIONS

English Translation of JP2008113108A.*

(Continued)

*Primary Examiner* — Joseph Saunders, Jr.
*Assistant Examiner* — James Mooney

(57) ABSTRACT

An electroacoustic transducer for converting electrical input signals into acoustic output signals includes a diaphragm adapted to move relative to a housing in response to the electrical input signals to produce the acoustic output signals, a displacement sensor, a bias voltage source, and an amplifier. The displacement sensor includes a first electrode adhered to the diaphragm and a second electrode on a first surface of the housing located proximate to the first electrode. A capacitance between the first electrode and the second electrode varies with a displacement of the diaphragm relative to the housing. The bias voltage source is coupled to at least one of the first electrode or the second electrode and provides a fixed charge to the electrode to which it is attached. The amplifier amplifies a change in voltage between the first and second electrodes to produce an output voltage between first and second signal outputs.

35 Claims, 11 Drawing Sheets

(56) References Cited

U.S. PATENT DOCUMENTS

| | | | |
|---|---|---|---|
| 2003/0044039 A1* | 3/2003 | Sterns et al. | 381/386 |
| 2003/0048911 A1 | 3/2003 | Furst et al. | |
| 2004/0184623 A1 | 9/2004 | Johannsen et al. | |
| 2005/0025317 A1* | 2/2005 | Fedigan | 381/59 |
| 2007/0147647 A1* | 6/2007 | Voishvillo | 381/343 |
| 2009/0232335 A1* | 9/2009 | Kondo et al. | 381/174 |
| 2010/0329495 A1 | 12/2010 | Wendell et al. | |

FOREIGN PATENT DOCUMENTS

| | | |
|---|---|---|
| JP | 06-205493 A | 7/1994 |
| JP | 2008113108 A | 5/2008 |

OTHER PUBLICATIONS

Catrysse, J.A.M., On the Design of Some Feedback Circuits for Loudspeakers, Katholike Industriele Hogeschool, B-8400 Oostende, Belgium, J. Audio Eng. Soc., vol. 33, No. 6, Jun. 1985, 6 pages.

Lane, Steve A. and Clark, Improving Loudspeaker Performance for Active Nosie Control Applications, Department of Mechanical Engineering and Materials Duke University, Durham, NC 277708-0302, USA, J. Audio Eng. Soc., vol. 46, No. 6, Jun. 1998, 12 pages.

International Search Report and Written Opinion dated Apr. 18, 2012 for PCT/US2012/020400.

* cited by examiner

TRANSDUCER WITH INTEGRATED SENSOR

CONTINUITY

This application is a continuation of, and claims priority to, U.S. patent application Ser. No. 12/969,685, filed Jan. 9, 2011, and incorporated here by reference.

BACKGROUND

This disclosure relates to an electromechanical transducer with an integrated sensor for measuring displacement and its derivatives.

An electromechanical transducer with such an integrated sensor permits feedback control systems to directly measure displacement of the moving portion of an electromechanical transducer. Displacement measurements can be derived to obtain velocity, acceleration, and jerk. One or more of these measurements can be directly or indirectly used by a feedback control system for system control.

SUMMARY

In general, in some aspects, an electroacoustic transducer includes a housing and a moving portion located proximate to the housing and adapted to move relative to the housing. The transducer also includes a displacement sensor, which includes a first electrode adhered to the moving portion of the transducer, a second electrode on a first surface of the housing, located proximate to a first region of the first electrode, and a third electrode on the first surface of the housing, located proximate to a second region of the first electrode. A first capacitance between the first electrode and the second electrode and a second capacitance between the first electrode and the third electrode each vary similarly with a displacement of the moving portion relative to the housing. An impedance buffer is coupled to the second electrode and the third electrode.

Implementations may include one or more of the following. The change in distance between a first surface of the housing and the first surface of the moving portion resulting from movement of the moving portion is substantially uniform over the area of the second and third electrodes. The impedance buffer may include a bias voltage source providing a fixed charge to at least one of the electrodes of the displacement sensor, and an amplifier amplifying a change in voltage between the first and second electrodes to produce an output voltage between first and second signal outputs. The moving portion may be metal and may include the first electrode. The moving portion may include a diaphragm.

The first surface of the housing may be a surface of a printed circuit board, and the second and third electrodes may be formed from metal areas on the printed circuit board. The housing may include a basket. The housing may include a pole piece. The moving portion may include a voice coil mechanically coupled to a diaphragm. The moving portion may include a magnet mechanically coupled to a diaphragm. The layer of metal of the first electrode may include a coating on a non-conductive substrate.

The transducer may include a compression-type electroacoustic transducer, with the housing including a phase plug and the second electrode and third electrode formed from metal on a surface of the phase plug. The phase plug may include a plurality of distinct parts, and the second and third electrode may be formed from layers of metal conforming to portions of a surface of one of the plurality of parts of the phase plug, or they may be formed from solid metal portions of one of the plurality of parts of the phase plug. The first surface of the housing may be a surface of a block of conductive material, and the second and third electrodes may be formed from portions of the block that are electrically insulated from each other. The first surface of the housing may be a surface of a block of non-conductive material, and the second and third electrodes may be formed from layers of metal adhered to the block of non-conductive material.

The amplifier may include a transistor having its gate coupled to a first terminal of the displacement sensor and its source and drain coupled to a first signal output and a second signal output. The bias voltage source may include an external power source having a first terminal coupled to the drain of the transistor and a second terminal coupled to a second terminal of the displacement sensor, the bias voltage being applied to the at least one of the electrodes via gate leakage of the transistor. The bias voltage source may include a permanently charged material within the at least one of the electrodes.

In general, in another aspect, an electroacoustic transducer includes a housing and a diaphragm located proximate to the housing and adapted to move relative to the housing. The transducer also includes a displacement sensor, which includes a first electrode adhered to the housing, a second electrode on a first surface of the diaphragm, located proximate to a first region of the first electrode, and a third electrode on the first surface of the diaphragm, located proximate to a second region of the first electrode. A first capacitance between the first electrode and the second electrode and a second capacitance between the first electrode and the third electrode each vary similarly with a displacement of the moving portion relative to the housing. An impedance buffer is coupled to the second electrode and the third electrode.

The second and third electrode may each include a layer of metal adhered to a top surface of the diaphragm facing away from the first surface of the housing, the diaphragm may be attached to the housing by a ring surrounding a periphery of the diaphragm, and electrical connections to the second and third electrodes may be made via the ring. The second and third electrode may each include a layer of metal adhered to a bottom surface of the diaphragm facing towards the first surface of the housing, and electrical connections to the second and third electrodes may be made via the housing where the housing contacts an outer periphery of the diaphragm. The second and third electrodes may each include a layer of metal adhered to a bottom surface of the diaphragm facing towards the first surface of the housing, and electrical connections to the second and third electrodes may be made where a voice coil is mechanically coupled to the diaphragm.

Advantages include sensing the displacement of the moving structure without contacting it, so that the mechanical dynamic performance of the transducer is not substantially changed by the measurement. An integrated sensor may work over a broader frequency range and with lower noise than a discrete sensor.

Other features and advantages will be apparent from the description and the claims.

DESCRIPTION

Figure 1A:
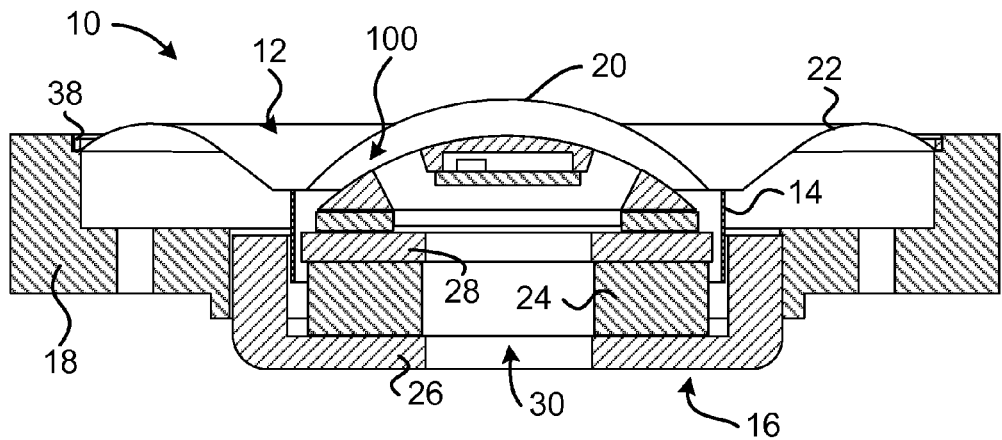
FIG. 1A shows a cross-sectional plan view of an electroacoustic transducer.
Figure 1B:
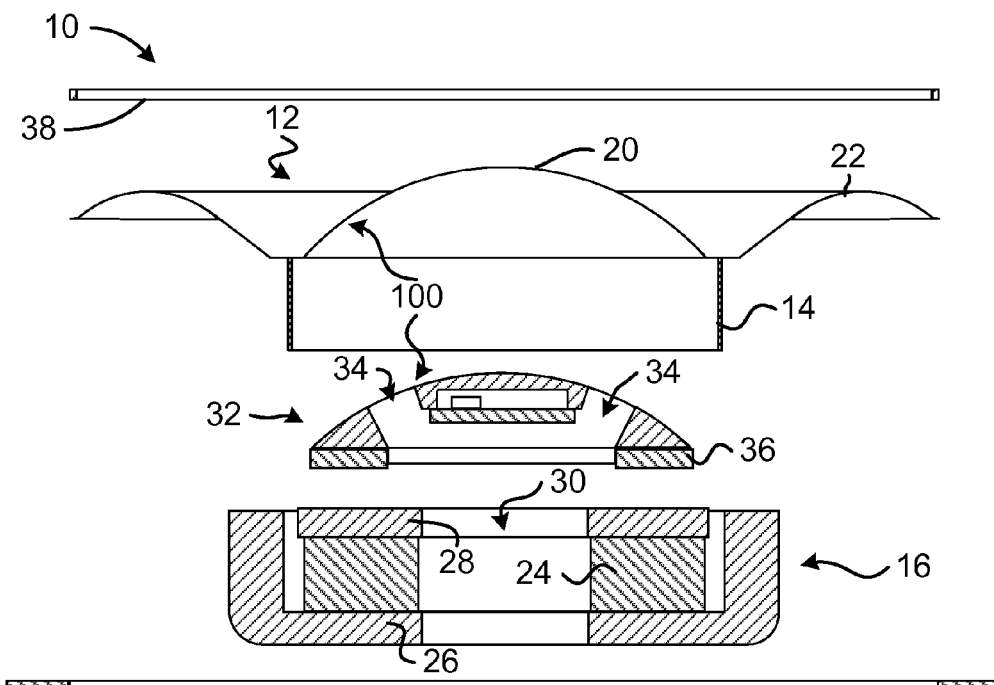
FIGS. 1B and 9 show exploded cross-sectional plan views of electroacoustic transducers
Figure 2:
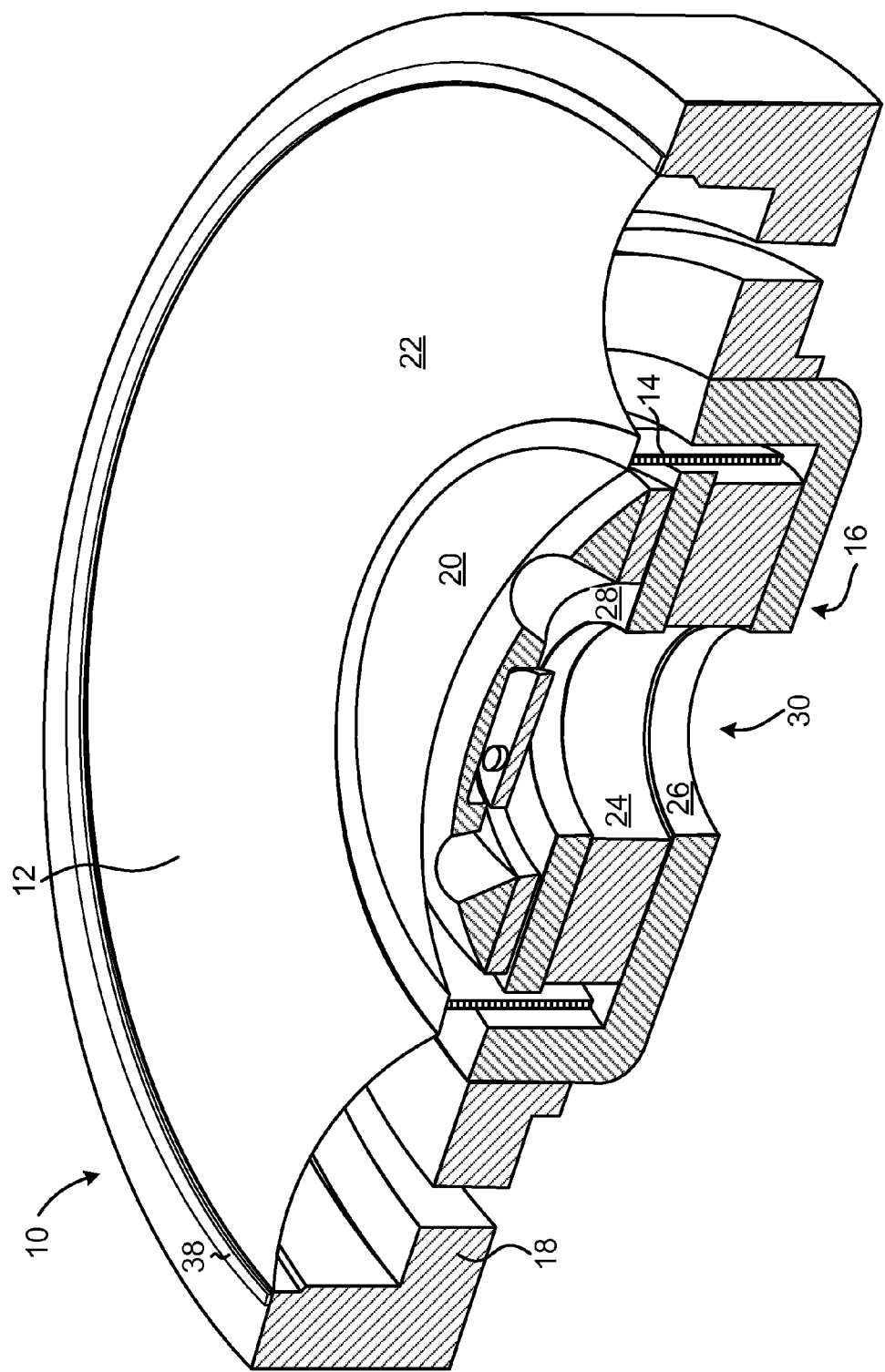
FIGS. 2 and 8 show cross-sectional isometric views of electroacoustic transducers.

An electromechanical transducer includes an integrated displacement sensor for directly measuring displacement (and its derivatives) of the transducer. Such a transducer can be advantageous in a feedback control system where perturbations to the transducer are corrected by the control loop. For example, an electroacoustic transducer (10) with an integrated sensor is shown in FIGS. 1A, 1B, and 2. Transducer 10 includes a diaphragm 12, a voice coil 14, a magnetic assembly 16, a basket 18, and an integrated capacitive sensor 100.

When electrical current is applied to the voice coil 14, it interacts with the magnetic field of the magnetic assembly 16 to produce the forces that move the voice coil 14 and diaphragm 12 relative to the magnetic assembly 16 and basket 18 to produce acoustic radiation. In some examples, the voice coil 14 and at least part of the magnetic assembly 16 are reversed, such that the magnetic assembly moves the diaphragm and the voice coil remains stationary relative to the basket. In the particular type of transducer shown, the diaphragm includes a dome 20 and a surround or suspension 22. In other types of transducers, a cone may be used to provide additional radiating surface area. In this example, the integrated capacitive sensor 100 directly measures displacement of the diaphragm.

Referring again to FIGS. 1A-1B and 2, the magnetic assembly 16 includes a ring magnet 24, a cup 26, and a top plate or coin 28. Other motor structure geometries may be used, depending on the particular application of the transducer. A hole 30 through the magnetic assembly allows air compressed on the back side of the diaphragm to escape out the back of the transducer. In some transducers, a limiter 32 seated atop the top plate physically limits the downward range of motion of the diaphragm, and has holes 34 to allow air to flow between the back side of the diaphragm and the hole 30 though the magnetic assembly. The limiter may be separated from the top plate 28 by a washer 36. A ring 38 anchors the outer periphery of the diaphragm 12 to the basket 18. The particular physical structures shown here are for illustration only, as the invention described below may be applicable to any type of electroacoustic transducer, however constructed. The physical components that support the active parts of the transducer but do not themselves contribute to the acoustic function aside from being present in the environment, such as the basket 18, washer 36, and limiter 32, are referred to generically as the "housing."

Figure 3:
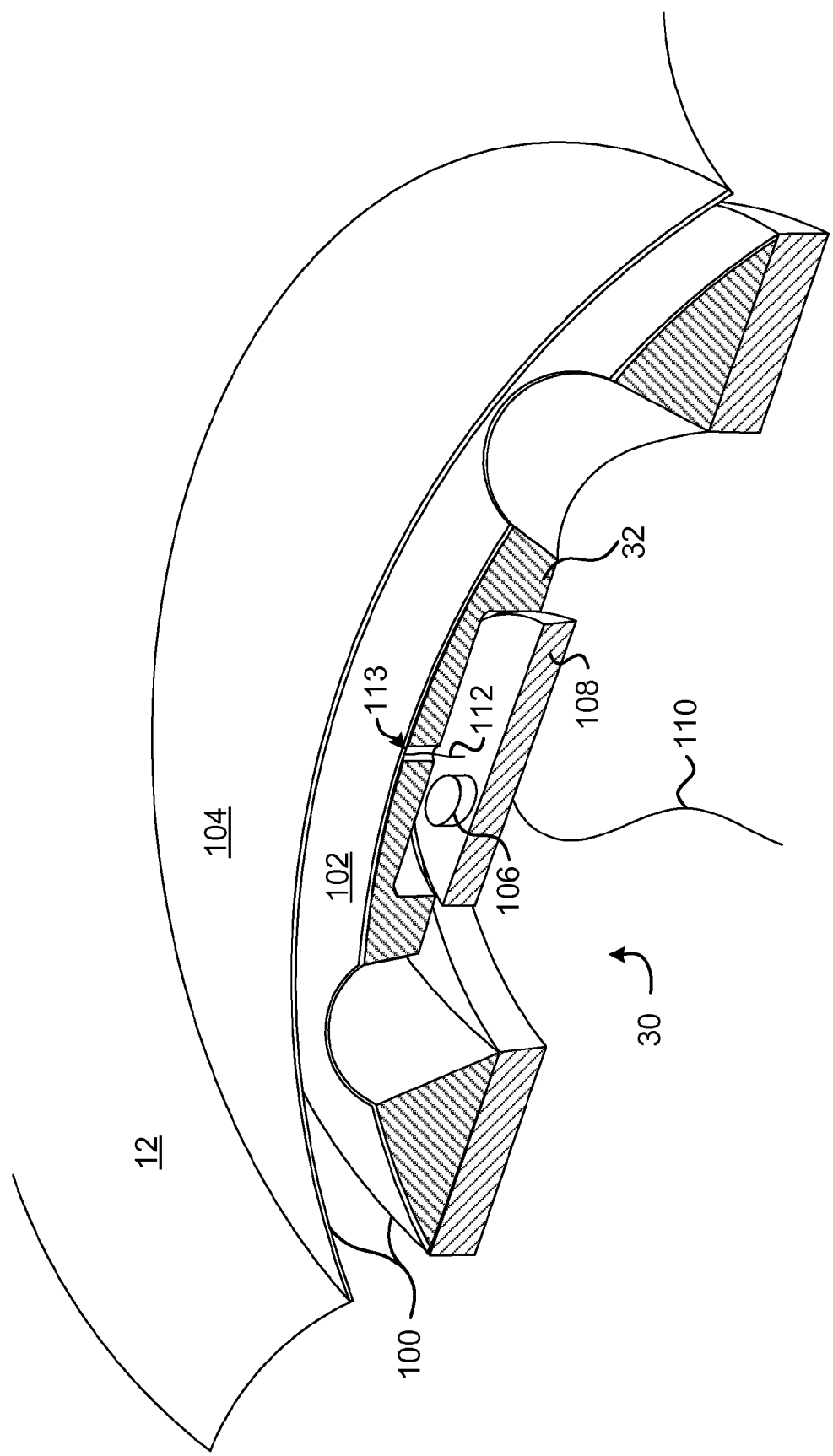
FIGS. 3, 6A, and 6B show close-up isometric views of an integrated sensor in an electroacoustic transducer.

The capacitive sensor 100 measures displacement of the diaphragm. This sensor is shown enlarged in FIG. 3. The capacitive sensor 100 includes a layer of metal 102 on the limiter, another layer of metal 104 on the diaphragm, circuitry 106 and circuit board 108, and various electrical connections between these components. In transducers lacking the limiter 32, a plate may be added or another structure within the transducer may be used to support the metal layer 102. In the example of FIG. 3, the circuitry 106 and circuit board 108 are shown inside the limiter, with a wire 110 providing a connection to outside circuitry through the hole 30 through the magnetic assembly. In other examples, the circuitry and any circuit board may be located farther from the metal layers, or outside the transducer entirely. Electrical connections 112 between the metal layer 102 and the circuit board may be made through a hole 113 through the limiter 32. Only one electrical component on the circuit board 108 is shown, but additional components may be provided on the circuit board in other implementations. An example circuit that may be implemented on the circuit board is described below in connection with FIG. 5.

The layer of metal on the limiter (e.g., layer 102) is referred as the back plate, while the layer of metal on the diaphragm (e.g., layer 104) is referred as the front plate (of a two plate capacitor). In operation, a bias voltage is applied across the plates, and the circuit elements react to the change in capacitance between the plates, which varies with the displacement of the diaphragm, to produce a voltage that is proportional to the change in the displacement. Specifically, the charge on the plates is held constant by the bias voltage, so the changing capacitance changes the voltage across the plates. The change in voltage across the plates is then measured as an indication of displacement. The circuit serves as an impedance buffer to convert the signals produced by the sensor to signals usable by external circuitry.

Figure 4A:
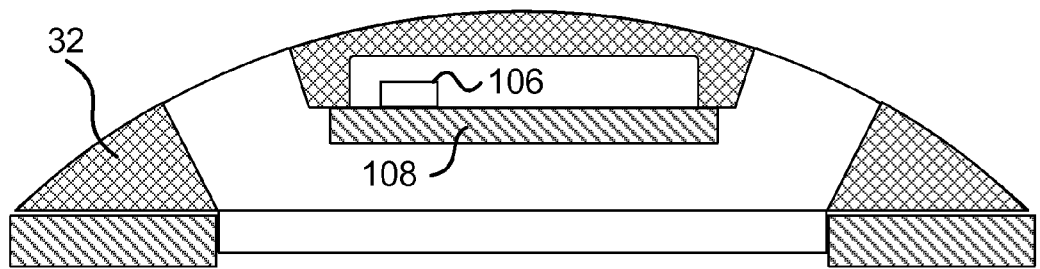
FIGS. 4A through 4D show close-up cross-sectional plan views of an electrical connection between components.
Figure 4B:
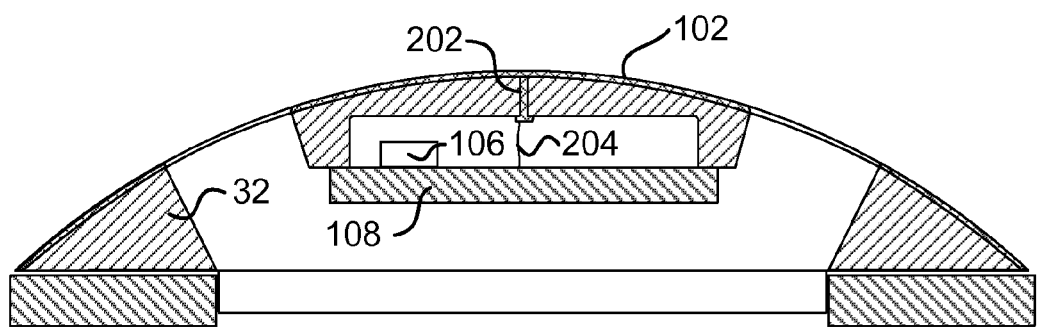
Figure 4C:
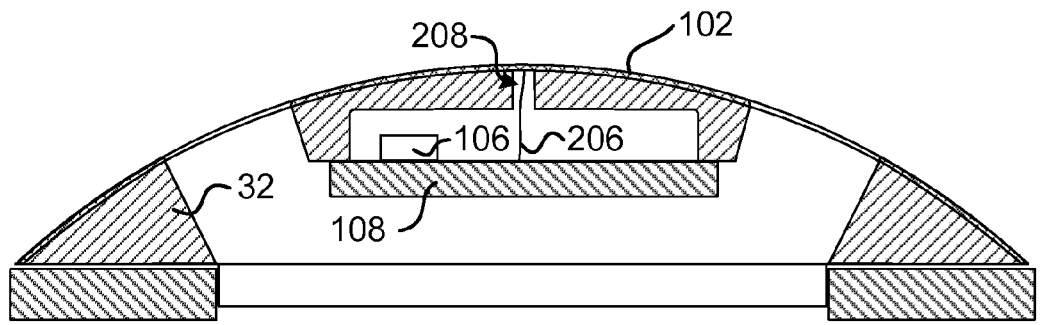

The circuitry may be coupled to the back plate in various ways, depending on the construction of the back plate and the limiter. In one example, as shown in FIG. 4A, the entire limiter 32 is made of metal, such as copper. In this example, no separate component is needed to serve as the back plate, and the connection between the limiter 32 and the circuit board 108 may be made directly, without requiring any wires. For example, such connections could be made by locating contact pads of the circuit board 108 at the points where the limiter 32 meets the circuit board, and solder or conductive paste used to attach the two. In another example, as shown in FIG. 4B, the back plate 102 is formed by a layer of metal on top of the limiter 32, and a conductive path through the limiter, such as a channel 202 filled with solder or other conductive material electrically coupled to the back plate 102, provides a connection point that can be connected to the circuit board 108. In the example of FIG. 4B, the connection point is spaced from the circuit board 108 and connected to it by a lead 204. In other examples, the conductive path extends to a part of the limiter already in contact with the circuit board, so no lead is needed, as in the metallic limiter example of FIG. 4A. In other examples, a conductive pin may extend from the circuit board into the channel 202. In yet another example, as shown in FIG. 4C, the back plate 102 is again provided by a layer of metal on top of the limiter 32, and the connection between the back plate and the circuit board 108 is made by a lead wire 206 extending through an opening 208 in the limiter. The back plate 102 in the examples of FIGS. 4B and 4C may be formed in any conventional manner of placing a metal layer on another object, including application of foil, metallic paint, electroplating, or vapor deposition, to name a few examples.

Figure 4D:
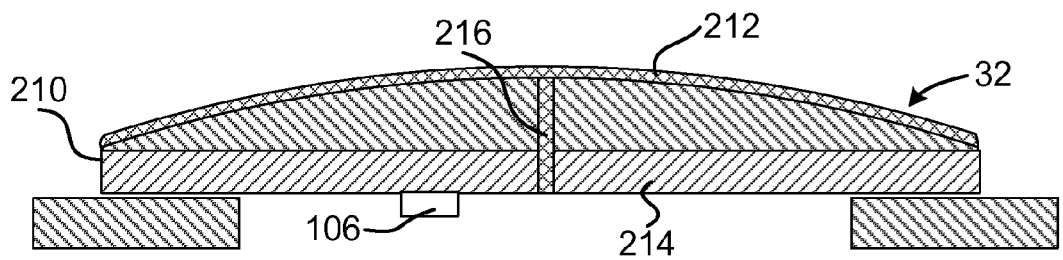

In another example, as shown in FIG. 4D, the limiter itself is formed from a printed circuit board 210, with the back plate provided by a metal layer 212, and the circuitry 106 and any other electronics mounted to the opposite side of another layer 214 of the combined limiter/circuit board 210. The metal layer 212 is shown having a curvature, and there are advantages to this, as explained below. In some examples, it may be preferred to keep the circuit board 210 flat and compensate for the benefits provided by the curvature in other ways. A conductive pathway 216, e.g., a standard via, connects the back plate layer 212 to the other layer 214 in a conventional manner for making connections between circuit board layers. Although the connection between the plate 102 and the circuit board 108 is shown in the center in each example, it may be located at other positions, or multiple connections may be made. In the example shown, a void beneath the circuit board 210 accommodates circuit elements such as the circuitry 106. If such a void is not present in a given implementation, stand-offs may be used to create a space for such components between the circuit board and the structure beneath. Each of these different options may be advantageous in different situations, dependent on such factors as the sizes or curvatures of the components involved and the manufacturing processes used. For example, more discrete components may be used in a larger transducer, where there is more room, and more integrated components may be used in a smaller transducer, though the reverse may be advantageous in some situations.

In some examples, the entire front surface of the diaphragm, that is, the surface facing the outside of the transducer, is metallized, though only the portion aligned with the metal portion of the back plate contributes significantly to the measured capacitance. Metallized areas surrounding the aligned portions may contribute some small effects. The electrical connection to that active portion is made through the remaining metallized region that extends to the outer edge of the diaphragm. The ring 38 (shown in FIG. 2) used to attach the peripheral edge of the diaphragm to the basket is made of copper or another suitable conductive material, such that when the entire diaphragm is metallized, the electrical connection may be made at the ring 38. This avoids the need to connect a wire lead to a moving part, a source of both distortion and failures in many loudspeakers. In some examples, the metallization may be masked to provide a connection to the outer rim without covering the entire surface. The metallized layer of the diaphragm may also be connected by a passage through the diaphragm at the point where it is joined to the voice coil, or formed on the bottom side of the diaphragm in the first place, allowing the electrical connection to the metallized layer to be made near the voice coil, the same point that other connections are made to the moving parts of the driver. It has been found that a metal layer on the diaphragm as thin as about 150 Å provides sufficient capacitance to reliably measure the displacement of the diaphragm while adding a negligible amount of moving mass. In some examples, the diaphragm material is sufficiently thin that the choice of side for metallization does not appreciably affect the capacitance or the responsiveness of the sensor, and which side of the diaphragm is metallized may be based on manufacturing convenience. In some examples, the entire diaphragm may be made of a metallic material.

In some examples, the bias voltage is provided by a battery coupled through a large bias resistor to the diaphragm plate and back plate. Other sources of bias voltage may include phantom power over the signal connection, or permanent charges in one or both of the plates, as in an electret microphone. The external bias voltage, when used, is connected to one plate of the capacitor through a circuit element, such as a field-effect transistor (FET). This circuitry serves to convert the high output impedance of the capacitive sensor into a low output impedance driver, in some cases with amplification as well, for driving external circuitry with reduced susceptibility to noise and interference. Such circuitry can be generally referred as an impedance buffer. One example of an impedance buffer useful in this situation is a FET connected as a common-source amplifier. The FET provides a high input impedance so that it does not load the sensor, and also provides a low output impedance for communicating the small measured voltages between the plates along long signal lines. In addition, the FET works well because its gate leakage provides high impedance required by the bias voltage without requiring a large bias resistor as in a condenser microphone.

Various types of field-effect transistors may be used, such as junction field-effect transistors (JFET) or metal-oxide field-effect transistors (MOSFET). Other types of amplifiers can also be used for the impedance buffer, and references to a FET herein is exemplary only—it is not intended to be limiting.

Figure 5:
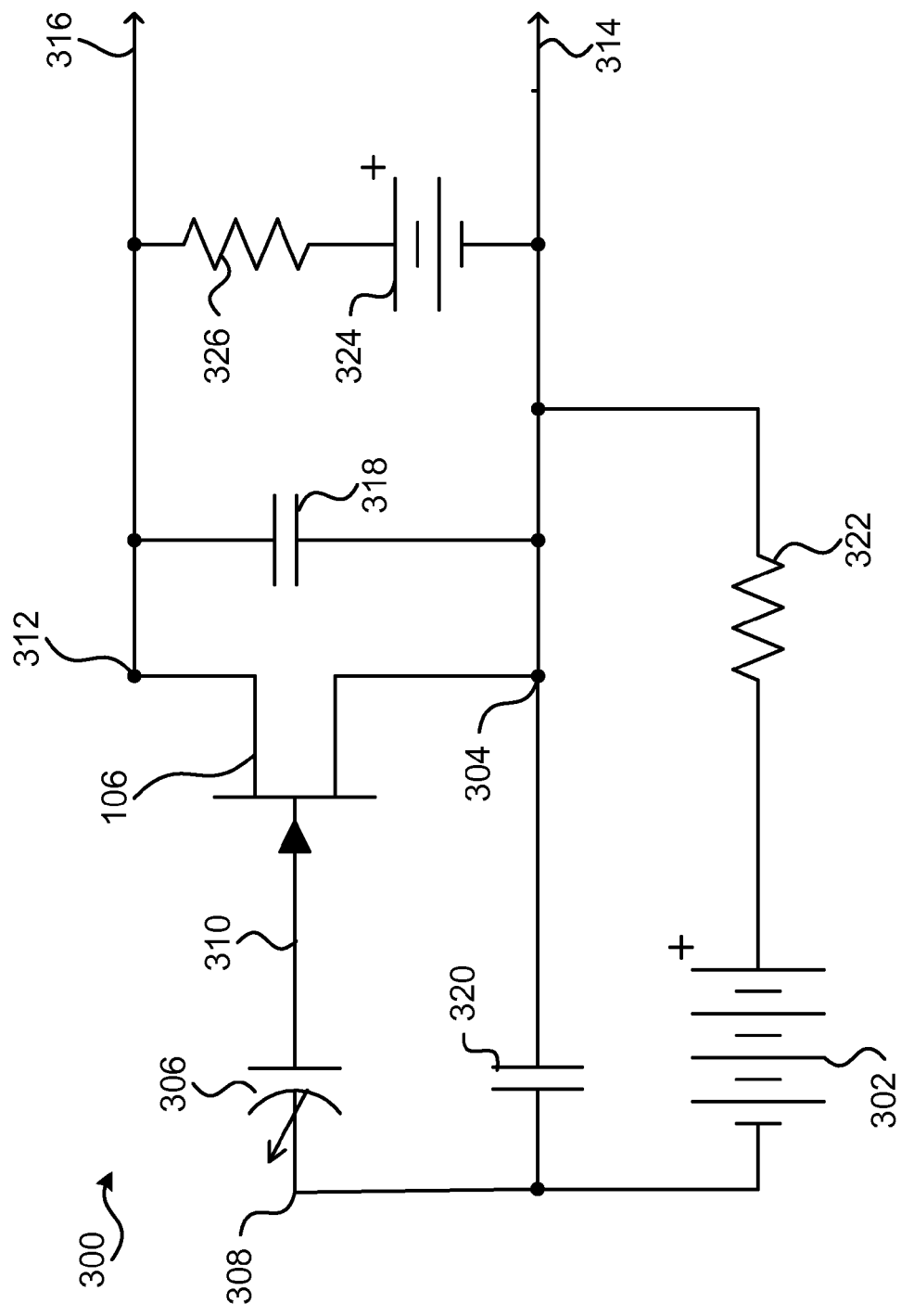
FIGS. 5, 7, and 10 show schematic circuit diagrams.

The bias voltage and FET are coupled to the plates and provide an output signal as shown in FIG. 5. In this representative circuit 300, one side of the bias supply 302 is connected to the source terminal of the FET 106 at a node 304, and biases the stationary plate through the FET's leakage impedance. In the example of FIG. 5, this connection also includes a current limiting resistor 322. This optional resistor 322 acts as a fuse to prevent the bias supply from damaging the FET if the two plates of the sensor are shorted. The other side of the bias supply 302 is connected to the front plate on the diaphragm, represented as one terminal of a variable capacitor 306, at a node 308. In some examples, the diaphragm and the bias supply are coupled through a common ground, rather than through a specific node 308. The polarity of the bias supply may be reversed from that shown in FIG. 5. In the example that one or both of the plates is permanently charged, the bias supply 302 is essentially integrated into the plate itself (i.e., into the variable capacitor 306), and the battery 302 in the circuit diagram of FIG. 5 is replaced by a virtual high-impedance source. The other terminal of the capacitor, representing the back plate located on the limiter, is coupled at node 310 to the gate terminal of the FET 106.

The capacitance of the two parallel plates is found from the well-known formula:

$$C_0 = \frac{k\varepsilon A}{d_0}, \quad (1)$$

where k is a unitless factor to account for edge effects and is typically $\approx 1$, $\in$ is the dielectric constant in air ($8.9 \times 10^{-15}$ F/mm), A is the area of the plates in mm$^2$, and $d_0$ is the resting distance between the plates in mm (any suitable system of units may be used). When the moving plate moves by an amount $\Delta d$, the capacitance becomes $$C = \frac{k\varepsilon A}{d_0 + \Delta d}. \quad (2)$$

From (2), capacitance is non-linearly related to the displacement. To obtain a measurement that is linearly related to displacement, a bias voltage $e_0$ is applied, as in a condenser microphone. A bias voltage applied across the parallel plates through a high impedance results in a constant charge $Q_0$ on the plates, given by:

$$Q_0 = C_0 e_0 = \frac{k\varepsilon A}{d_0} e_0. \quad (3)$$

When the moving plate moves by $\Delta d$, the charge $Q_0$ resulting from the bias voltage stays the same, but the voltage across the plates changes to $e=e_0+\Delta e$, thus $$Q_0 = Ce = \frac{k\varepsilon A}{d_0 + \Delta d}(e_0 + \Delta e) = C_0 e_0 = \frac{k\varepsilon A}{d_0} e_0. \quad (4)$$

Solving for the relationship between voltage change and displacement gives:

$$\Delta e = \frac{e_0}{d_0}\Delta d. \qquad (5)$$

Thus, as the capacitance varies, with a bias voltage applied to the plates, the voltage at the gate of the FET varies linearly with the displacement of the diaphragm.

Such a linear output may be more useful in subsequent uses of the displacement measurement than an inversely-proportional measurement of actual capacitance would be. Once displacement is known, its derivative may be used to provide the velocity of the diaphragm, and that may in turn be derived into acceleration, depending on the signal processing needs of the device and its users.

The FET amplifies the gate voltage to provide a corresponding voltage across the source and drain. The source terminal and drain terminal of the FET are coupled to the signal outputs 314, 316, as well as to several additional components, at nodes 304 and 312. A small capacitor 318, on the order of 40-50 pF, across the FET from drain to source provides protection from radio-frequency (RF) noise. A small shunt capacitor 320, on the order of 0.1 µF, provides protection from noise pickup by the bias supply connections. As mentioned above, the optional resistor 322 in series with the bias supply, on the order of 100 kΩ, protects the high-voltage bias supply from short-circuiting. Phantom power for the FET is represented by a supply 324 and bias resistor 326 across the output lines.

Contrary to what might be expected, the curvature of the plates does not compromise the measurement or require more-complicated processing. While the curvature does make the measurement less linear, as the fact that the two plates remain parallel, that is, the variable distance between the plates is the same at every point, the sensor remains sufficiently linear for practical purposes. The curvature, by increasing the surface area, also helps maximize the total capacitance for a given maximum displacement. The curvature of the dome is desirable because it increases the diaphragm's stiffness and thereby reduces breakup of the diaphragm, which could lead to non-linear performance of both the transducer and the sensor.

Various types of external sensor may interfere with the dynamic performance of the transducer, either by accidentally contacting the diaphragm if located too close, or by mass-loading the diaphragm if attached to it. Because the sensor described herein is integrated into the transducer, and the added moving mass of metalizing the diaphragm is negligible, it does not change the dynamic behavior of the transducer in any measurable way, leaving the acoustic performance of the transducer unchanged. An integrated sensor also works over a broad frequency range with low noise, as the body of the driver shields the sensor, both physically and magnetically, and provides an intimate connection between the sensor and the diaphragm it is measuring. Integrating the electronics allows the connections between the sensor and the FET to be very short, reducing interference from outside noise. Integration also allows the FET to amplify the signal before it ever leaves the transducer, providing a large output signal voltage that is less susceptible to noise in the signal path. The cost of adding such a sensor to a transducer may also be lower than other sensors.

Figure 6A:
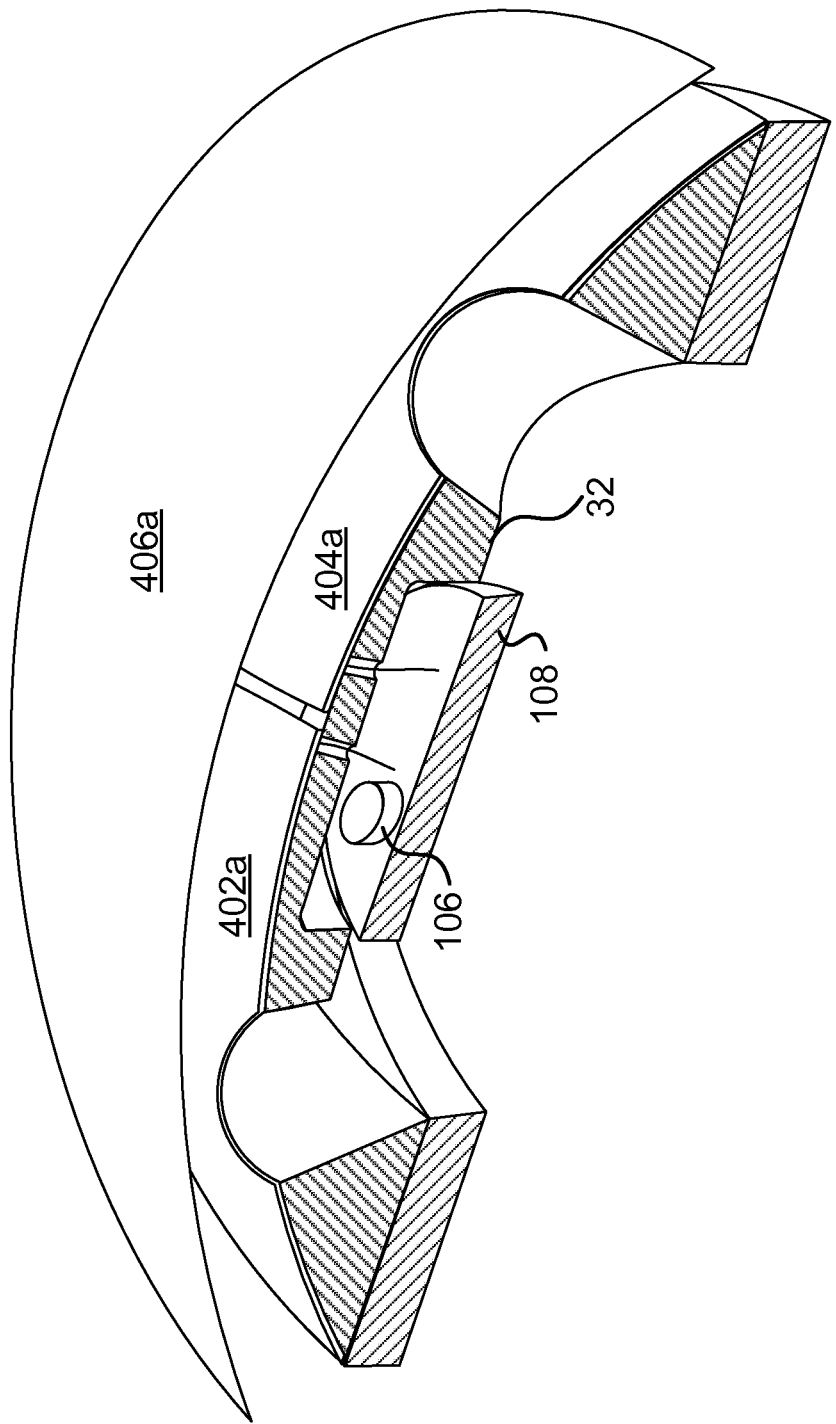
Figure 6B:
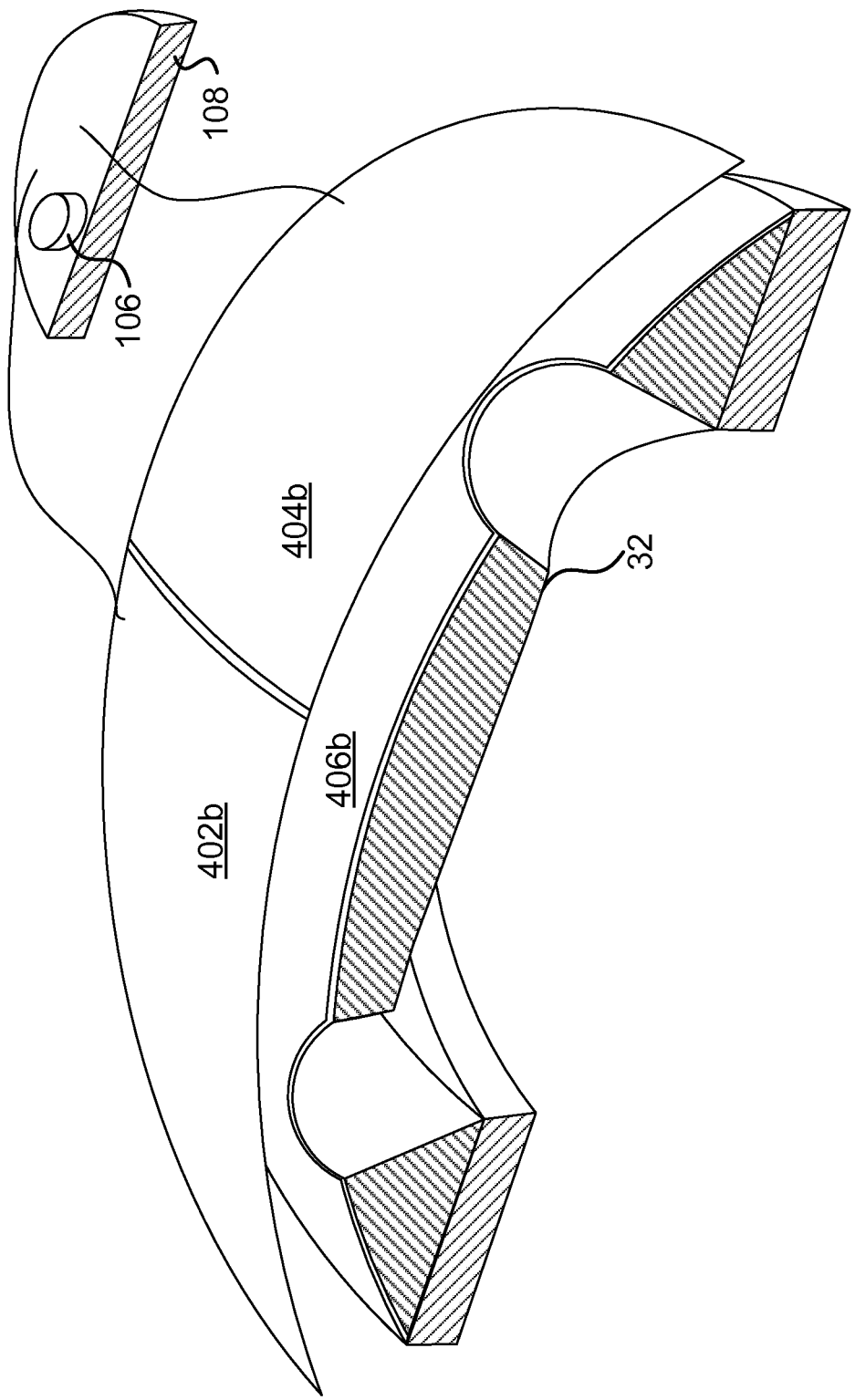
Figure 7:
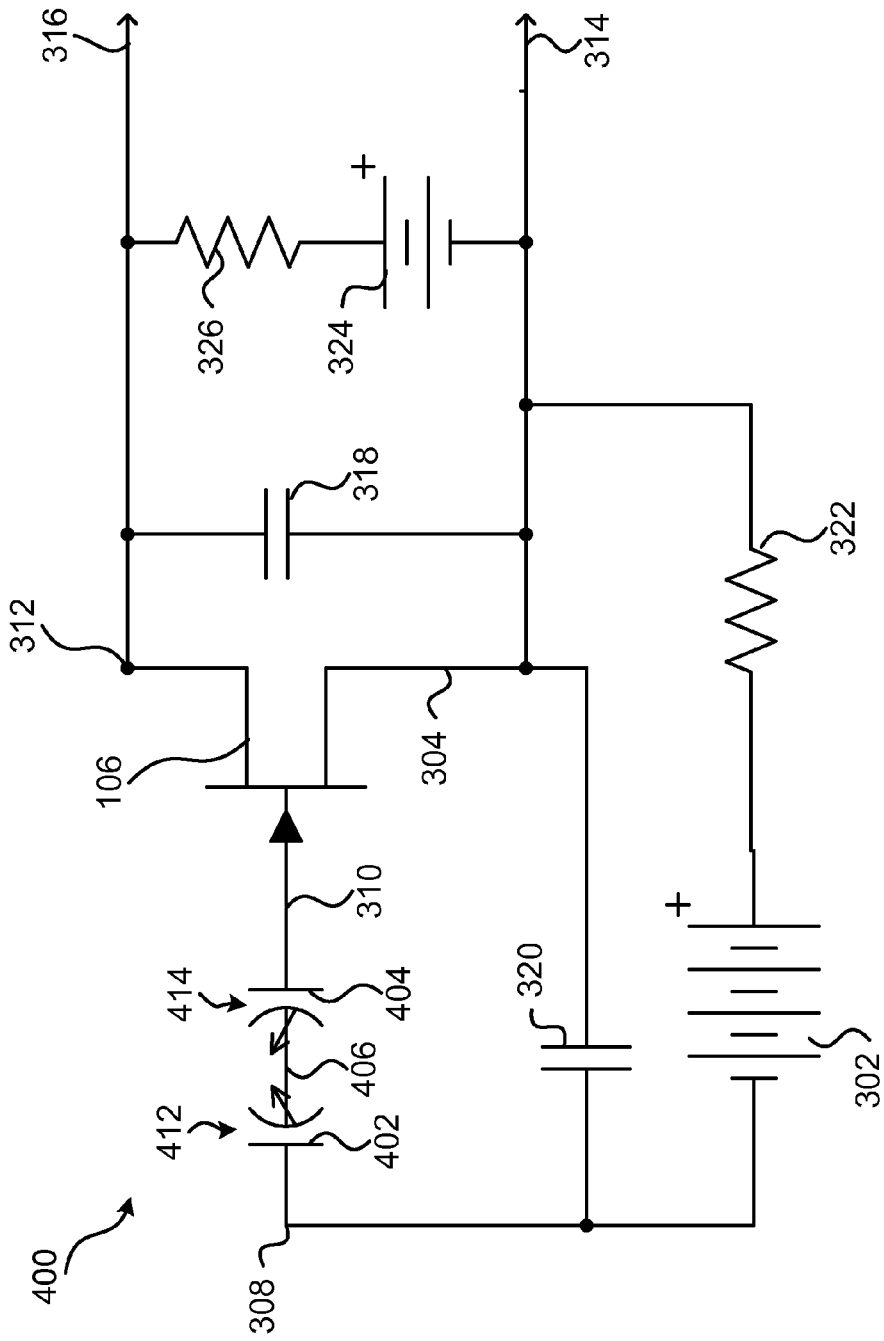

In another embodiment, as shown in FIGS. 6A, 6B, and 7, one of the plates may be split into two electrically isolated parts 402a and 404b (FIG. 6A) or 402b and 404b (FIG. 6B), with the DC bias applied between those two parts. The other plate 406a (FIG. 6A) or 406b (FIG. 6B) is not connected to the electrical circuit except through capacitance with the two halves of the split plate. In this embodiment, the capacitances between each of the two split plates 402a/b and 404a/b and the solid plate 406a/b vary together. A differential voltage is created by applying opposite bias charge on the two parts of the split plate, obviating the need to connect a voltage source or signal connection to the single plate. In the case of FIG. 6A, this has the advantage of not requiring connections to the moving diaphragm. In the alternative case of FIG. 6B, the advantage is in not requiring circuitry inside the transducer, as the connections from the split plates 402b and 404b to the circuit board 108 may be made externally. Those connections may be made to the diaphragm in the same manner discussed above, e.g., metalizing the entire surface of the diaphragm (but for a space between the two plates) and contacting the metalized layer where it is anchored at the edge, as in FIG. 2.

This split sensor is represented by two variable capacitors 412, 414 in series. The parts of the capacitor symbols corresponding to plates 402, 404, and 406 are also labeled in FIG. 7 for convenience. These two capacitors 412, 414 each have one-half the capacitance of a single-plate version with the same total surface area, and their capacitances change with displacement at the same rate. Each half is biased with half of the single-plate bias voltage, but the voltage change from the two halves adds, so the sensitivity to displacement remains the same as that found in equation (5) above in the single-plate version. This means that a measurement circuit 400 that is basically the same as the circuit 300 used for the single-plate version, shown in FIG. 5, can be used with the two-plate version, as shown in FIG. 7. The only structural difference is the two variable capacitors 412 and 414 representing the capacitive plates, though of course the values of specific elements may be different. The two-plate implementation also improves common-mode rejection. Because the two split plates 402 and 404 receive the same common-mode noise but are opposed to each other in the circuit 400, that noise is isolated from the net signal output. While the split plates are shown as identical half-moon shapes in the embodiments of both FIG. 6A and FIG. 6B, other shapes are possible. For example, they could be concentric rings, or a ring and a disc. It is preferable that they be of the same area, but adjustments for differing areas could be made in the circuitry. In some examples, a larger number of plates may be used, such as pie-piece segments, with every other segment having one voltage level and the other segments the opposite voltage. This may further enhance resistance to some types of noise, and would be easier to connect to external circuitry, in the case of the split plates being on the diaphragm, than concentric plates.

In the split-plate embodiment shown in FIG. 6A, all of the electrically-connected parts of the sensor are stationary, improving its mechanical reliability. The sensor components are not subject to mechanical fatigue, there is less moving mass, and the moving parts may have better balance and symmetry. Even in the embodiment of FIG. 6B, this advantage is achieved if the connections are made at or beyond the point that the diaphragm is anchored to the basket. Avoiding additional connections to the moving parts also makes the transducer easier to assemble. This all leads to a more accurate sensor and a more robust part.

The split-plate embodiment is particularly useful in certain types of transducers, such as compression drivers, where the diaphragm may already be metal, but be difficult to connect to electrically. In a compression driver, the back plate may be formed as a metallized layer on the top surface of the phase plug. A novel type of compression driver is described in U.S. patent application Ser. No. 12/490,463, filed Jun. 24, 2009, and incorporated fully here by reference. The phase plug and part of the surrounding structure and diaphragm from that application is shown combined with the present invention in FIG. 8.

Figure 8:
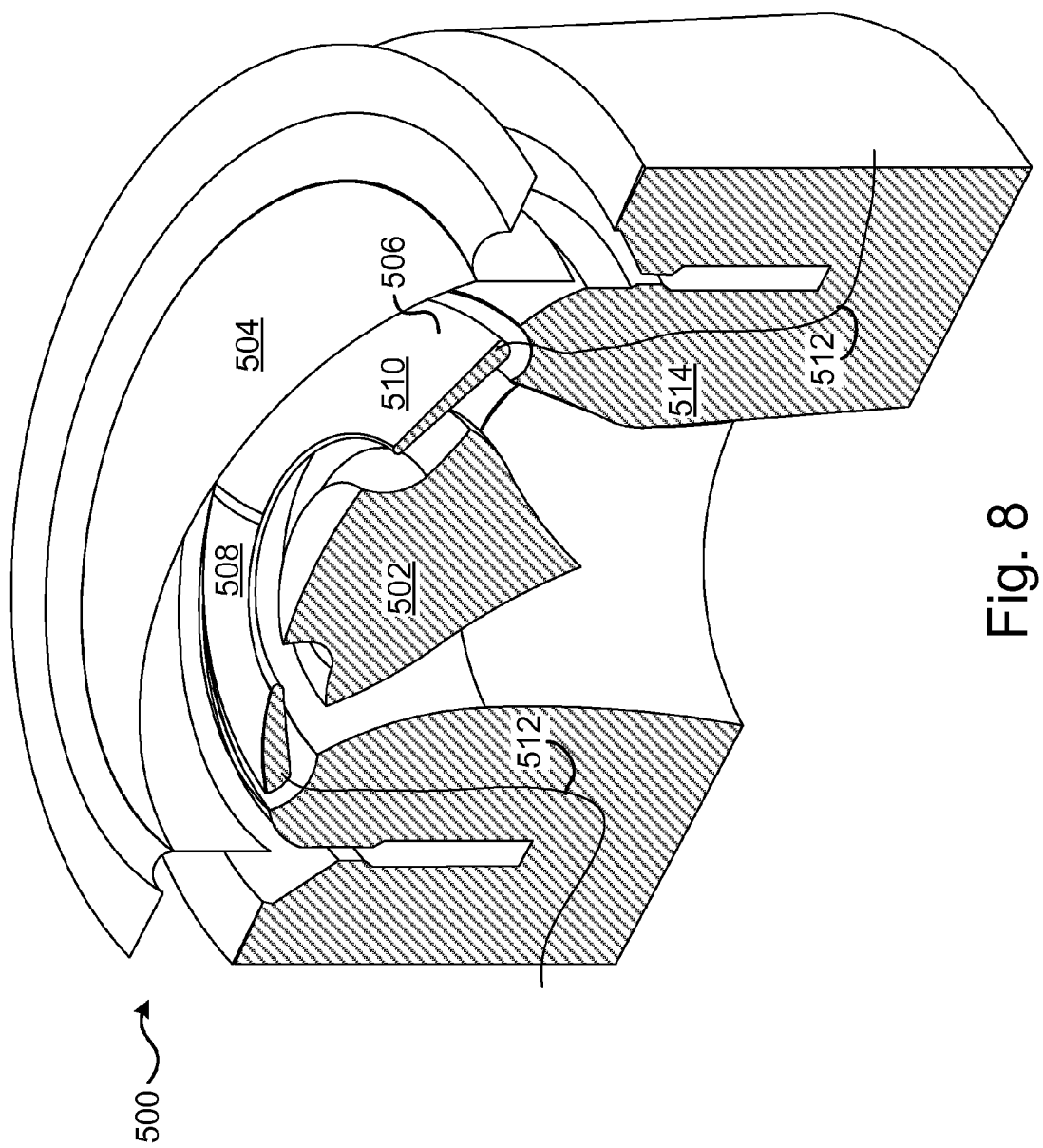

As shown in FIG. 8, the compression driver 500 includes a phase plug 502 and a diaphragm 504 (shown raised from its normal position). The compression driver's mechanical and electrical structures are not specifically shown. Part of the phase plug, the bridge 506, is metallized or made of a separate, metal, part, and provides the two halves 508, 510 of the back plate. In the example of FIG. 8, the back plates are connected to the biasing and amplifying circuit (not shown) by connections 512 through the body 514 of the motor structure. These connections may be routed, for example, through legs (not shown) supporting the bridge element 506. In other examples, the circuit may be attached to or embedded in the phase plug and may be closer to the back plate, as in the previous examples.

In another embodiment, the fixed plate may be a porous screen located in front of and conformal to the diaphragm, locating the sensor on the outside of the transducer. In this example, the porosity of the fixed plate avoids significantly changing the acoustic loading on the diaphragm. This construction also avoids having to provide an electrical connection through the motor structure.

Figure 9:
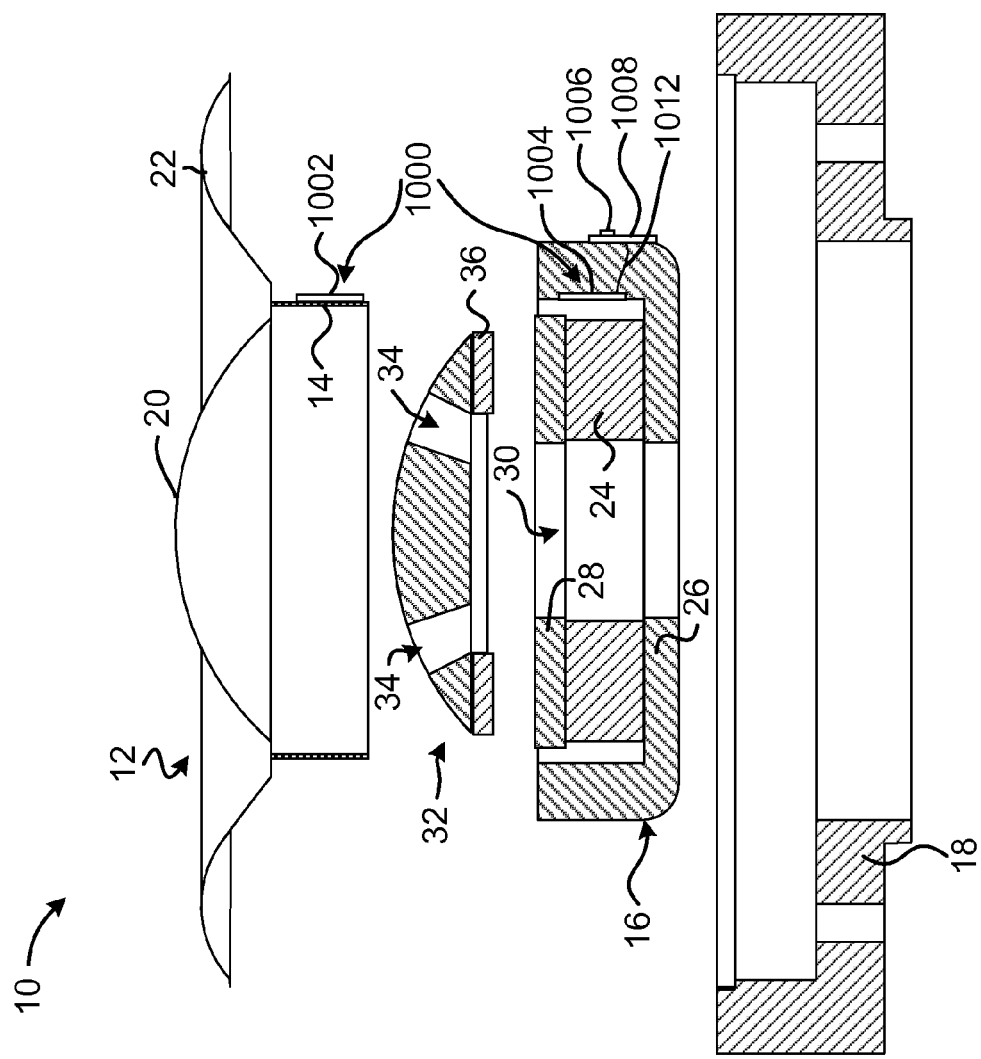
Figure 10:
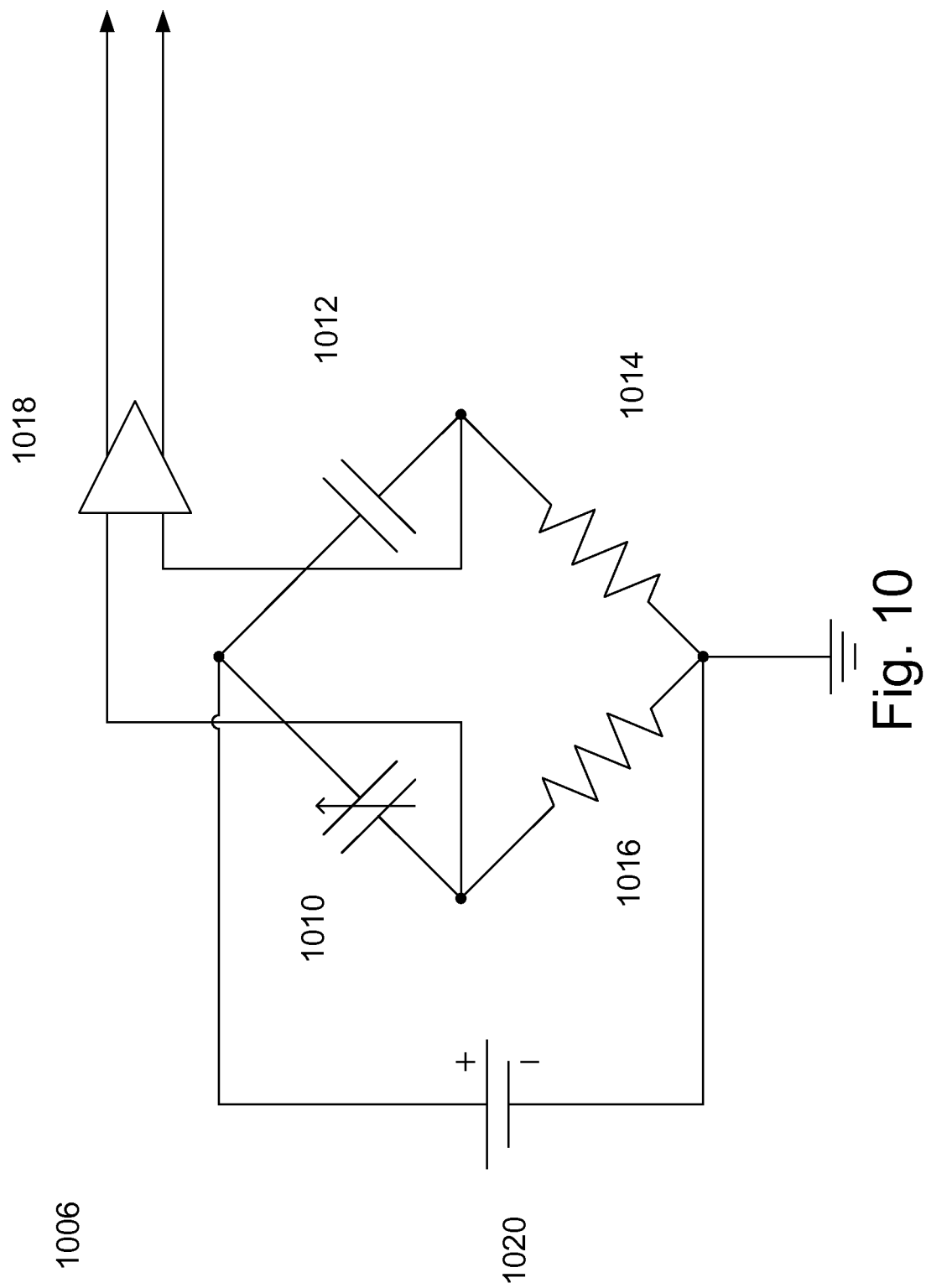

In another embodiment, as shown in FIG. 9, a sensor 1000 is implemented as plates 1002 and 1004 located on the side of the motor structure, such that one plate slides past the other, varying the surface area of the capacitor. In this embodiment, the capacitance varies linearly with the aligned surface area and therefore with the displacement:

$$A = A_0 - w \times \Delta l \quad (6)$$

$$\Delta C = C_0 - C = \frac{k\varepsilon A_0}{d_0} - \frac{k\varepsilon(A_0 - w\Delta l)}{d_0} = \frac{k\varepsilon w \Delta l}{d_0}, \quad (7)$$

where w and l are the width and length of the plates, $A_0 = w \times l$. Displacement is represented by $\Delta l$, as the moving plate moves in the direction of the length, while the gap $d_0$ remains unchanged. To convert the capacitance to an output signal representing the displacement, the electrodes are coupled to an RF bridge circuit 1006 such as that shown in FIG. 10. The circuit board 1008 may be located on the outside of the motor structure, and coupled to the plate(s) by leads 1012 (no lead to the moving plate is shown). As in the example of FIG. 6, there may be two plates on the stationary side, removing the need to provide a connection to the moving plate 1002. In the RF bridge circuit 1006, the capacitor formed by the moving plates is represented as a variable capacitor 1010. Fixed capacitor 1012 and resistors 1014 and 1016 cause the voltage at the center of the bridge, amplified by an amplifier 1018, to vary with the capacitance of the plates. A bias supply 1020 provides the fixed charge to the plates. If two plates are used on the stationary side, they are represented in the circuit by two capacitors back-to-back as in the example FIG. 7.

Electromechanical transducers include electroacoustic transducers (also referred to as loudspeakers and microphones), linear or rotary electric motors, and electromechanical sensors. This disclosure is concerned generally with transducers that cause or measure small and generally oscillating movements, where a moving portion of the transducer moves back and forth around a stationary portion. For example, in a loudspeaker, the acoustically-radiating surface, referred to as the diaphragm, and some portion of the motor structure move back and forth, while another portion of the motor structure remains stationary. In some examples, the moving portion of the motor is a voice coil positioned around a magnetic structure. In other examples, the voice coil is inside a hollow magnetic structure. In still other examples, the coil is stationary and it is the magnet that moves the diaphragm, or the diaphragm is magnetically responsive and requires no additional moving components. In non-acoustic applications, an electromagnetic linear motor includes a moving armature and a stationary stator. Either one of the armature and stator may include the magnets and the other the coils or some other mechanism for converting electric energy into motion of the armature.

Other implementations are within the scope of the following claims and other claims to which the applicant may be entitled.

What is claimed is:

1. An electroacoustic transducer for converting electrical input signals into acoustic output signals, the electroacoustic transducer comprising:
   a housing;
   a diaphragm located proximate to the housing, adapted to move relative to the housing in response to the electrical input signals to produce the acoustic output signals;
   a displacement sensor comprising:
      a first electrode adhered to the diaphragm, and
      a second electrode on a first surface of the housing located proximate to the first electrode,
      wherein a capacitance between the first electrode and the second electrode varies with a displacement of the diaphragm relative to the housing due to variation in the distance between the first electrode and the second electrode;
   a bias voltage source coupled to at least one of the first electrode or the second electrode and providing a fixed charge to the electrode to which it is attached; and
   an amplifier amplifying a change in voltage between the first and second electrodes to produce an output voltage between first and second signal outputs;
   wherein:
   the second electrode is located proximate to a first region of the first electrode;
   the displacement sensor further comprising a third electrode on the first surface of the housing located proximate to a second region of the first electrode;
   wherein the first capacitance between the first electrode and the second electrode and a second capacitance between the first electrode and the third electrode each vary by the same amount and in the same direction with a displacement of the diaphragm relative to the housing;
   the bias voltage source is coupled to the second electrode and the third electrode; and
   the amplifier amplifies a change in total voltage between the second and third electrodes to produce the output voltage.

2. The electroacoustic transducer of claim 1 wherein the change in distance between a first surface of the housing and the diaphragm resulting from movement of the diaphragm is substantially uniform over the area of the second and third electrodes.

3. The electroacoustic transducer of claim 1 wherein the amplifier comprises a transistor having its gate coupled to the second electrode and its source and drain coupled to the first and second signal outputs.

4. The electroacoustic transducer of claim 3 wherein the bias voltage source comprises an external power source having a first terminal coupled to the source of the transistor and a second terminal coupled to the third electrode, the bias voltage being applied to the second electrode via gate leakage of the transistor.

5. The electroacoustic transducer of claim 1 wherein:
the transducer comprises a compression-type electroacoustic transducer;
the housing comprises a phase plug; and
the second electrode and third electrode comprise metal on a surface of the phase plug.

6. The electroacoustic transducer of claim 5 wherein:
the phase plug comprises a plurality of distinct parts; and
the second and third electrode comprise layers of metal conforming to non-conducting portions of a surface of one of the plurality of parts of the phase plug.

7. The electroacoustic transducer of claim 5 wherein:
the phase plug comprises a plurality of distinct solid metal parts; and
the second and third electrode comprise portions of one of the plurality of solid metal parts of the phase plug.

8. The electroacoustic transducer of claim 1 wherein the first surface of the housing is a surface of a block of conductive material, and the second and third electrodes comprise portions of the block that are electrically insulated from each other.

9. The electroacoustic transducer of claim 1 wherein the first surface of the housing is a surface of a block of non-conductive material, and the second and third electrodes comprise layers of metal adhered to the block of non-conductive material.

10. The electroacoustic transducer of claim 1 wherein the first surface of the housing is a surface of a printed circuit board, and the second and third electrodes comprise metal areas on the printed circuit board.

11. The electroacoustic transducer of claim 1 wherein the housing comprises a basket.

12. The electroacoustic transducer of claim 1 wherein the housing comprises a pole piece.

13. The electroacoustic transducer of claim 1 wherein the first electrode comprises a conductive coating on a non-conductive substrate.

14. The electroacoustic transducer of claim 1 wherein the bias voltage source comprises a permanently charged material within the at least one of the electrodes.

15. The electroacoustic transducer of claim 1 wherein the diaphragm is metal and comprises the first electrode.

16. An electroacoustic transducer for converting electrical input signals into acoustic output signals, the electroacoustic transducer comprising:
a housing;
a diaphragm located proximate to the housing, adapted to move relative to the housing in response to the electrical input signals to produce the acoustic output signals;
a displacement sensor comprising:
a first electrode adhered to the diaphragm, and
a second electrode on a first surface of the housing located proximate to the first electrode,
wherein a capacitance between the first electrode and the second electrode varies with a displacement of the diaphragm relative to the housing due to variation in the distance between the first electrode and the second electrode;
a bias voltage source coupled to at least one of the first electrode or the second electrode and providing a fixed charge to the electrode to which it is attached; and
an amplifier amplifying a change in voltage between the first and second electrodes to produce an output voltage between first and second signal outputs;
wherein:
the first electrode is located proximate to a first region of the second electrode;
the displacement sensor further comprises a third electrode adhered to the diaphragm and located proximate to a second region of the second electrode;
the first capacitance between the first electrode and the second electrode and a second capacitance between the third electrode and the second electrode each vary similarly with a displacement of the diaphragm relative to the housing;
the bias voltage source is coupled to the first electrode and the third electrode; and
the amplifier amplifies a change in total voltage between the first and third electrodes to produce the output voltage.

17. The electroacoustic transducer of claim 16 wherein:
the first and third electrode each comprise a layer of metal adhered to a top surface of the diaphragm facing away from the first surface of the housing;
the diaphragm is attached to the housing by a ring surrounding a periphery of the diaphragm; and
electrical connections to the first and third electrodes are made via the ring.

18. The electroacoustic transducer of claim 16 wherein:
the first and third electrode each comprise a layer of metal adhered to a bottom surface of the diaphragm facing towards the first surface of the housing; and
electrical connections to the first and third electrodes are made via the housing where the housing contacts an outer periphery of the diaphragm.

19. The electroacoustic transducer of claim 16 wherein:
the first and third electrode each comprise a layer of metal adhered to a bottom surface of the diaphragm facing towards the first surface of the housing;
the transducer further comprises a voice coil mechanically coupled to the diaphragm; and
electrical connections to the first and third electrodes are made where the voice coil is coupled to the diaphragm.

20. The electroacoustic transducer of claim 16 wherein the amplifier comprises a transistor having its gate coupled to the first electrode and its source and drain coupled to the first and second signal outputs.

21. The electroacoustic transducer of claim 20 wherein the bias voltage source comprises an external power source having a first terminal coupled to the source of the transistor and a second terminal coupled to the second electrode, the bias voltage being applied to the first electrode via gate leakage of the transistor.

22. The electroacoustic transducer of claim 16 wherein the housing comprises a basket.

23. The electroacoustic transducer of claim 16 wherein the housing comprises a pole piece.

24. The electroacoustic transducer of claim 16 wherein the first electrode comprises a conductive coating on a non-conductive substrate.

25. The electroacoustic transducer of claim 16 wherein the bias voltage source comprises a permanently charged material within the at least one of the electrodes.

26. The electroacoustic transducer of claim 16 wherein the diaphragm is metal and comprises the first electrode.

27. The electroacoustic transducer of claim 16 wherein the amplifier comprises a transistor having its gate coupled to the first electrode and its source and drain coupled to the first and second signal outputs.

28. The electroacoustic transducer of claim 27 wherein the bias voltage source comprises an external power source having a first terminal coupled to the source of the transistor and a second terminal coupled to the second electrode, the bias voltage being applied to the first electrode via gate leakage of the transistor.

29. An electroacoustic transducer for converting electrical input signals into acoustic output signals comprising:
  a housing;
  a moving portion located proximate to the housing, adapted to move relative to the housing in response to the electrical input signals;
  a displacement sensor comprising:
    a first electrode adhered to the moving portion,
    a second electrode on a first surface of the housing located proximate to a first region of the first electrode, and
    a third electrode on the first surface of the housing located proximate to a second region of the first electrode,
    wherein a first capacitance between the first electrode and the second electrode and a second capacitance between the first electrode and the third electrode each vary similarly with a displacement of the moving portion relative to the housing due to variation in the distance between the first electrode and the second electrode and between the first electrode and the third electrode;
  a bias voltage source coupled to the second electrode and the third electrode and providing a fixed charge to the second and third electrodes; and
  an amplifier amplifying a change in voltage between the second and third electrodes to produce an output voltage between first and second signal outputs.

30. The electroacoustic transducer of claim 29 wherein the moving portion comprises a diaphragm for producing the acoustic output signals.

31. The electroacoustic transducer of claim 29 wherein the moving portion comprises a magnet mechanically coupled to a diaphragm for producing the acoustic output signals.

32. An audio loudspeaker system comprising:
  an input for receiving audio signals for reproduction;
  an electroacoustic output transducer operably coupled to the input, the electroacoustic output transducer comprising:
    a housing;
    a diaphragm located proximate to the housing, adapted to move relative to the housing in response to the electrical input signals to produce the acoustic output signals; and
    a displacement sensor comprising:
      a first electrode adhered to the diaphragm, and
      a second electrode on a first surface of the housing located proximate to the first electrode,
      wherein a capacitance between the first electrode and the second electrode varies with a displacement of the diaphragm relative to the housing due to variation in the distance between the first electrode and the second electrode;
    a bias voltage source coupled to at least one of the first electrode or the second electrode of the displacement sensor and providing a fixed charge to the electrode to which it is attached; and
    an amplifier amplifying a change in voltage between the first and second electrodes to produce an output voltage between first and second signal outputs;
  wherein:
    the second electrode is located proximate to a first region of the first electrode;
    the displacement sensor further comprises a third electrode on the first surface of the housing located proximate to a second region of the first electrode;
    the first capacitance between the first electrode and the second electrode and a second capacitance between the first electrode and the third electrode each vary similarly with a displacement of the diaphragm relative to the housing;
    the bias voltage source is coupled to the second electrode and the third electrode; and
    the amplifier amplifies a change in total voltage between the second and third electrodes to produce the output voltage.

33. The electroacoustic transducer of claim 32 wherein the amplifier comprises a transistor having its gate coupled to the second electrode and its source and drain coupled to the first and second signal outputs.

34. The electroacoustic transducer of claim 33 wherein the bias voltage source comprises an external power source having a first terminal coupled to the source of the transistor and a second terminal coupled to the third electrode, the bias voltage being applied to the second electrode via gate leakage of the transistor.

35. The electroacoustic transducer of claim 32 wherein the bias voltage source comprises a permanently charged material within the at least one of the electrodes.

* * * * *